Patented Aug. 8, 1950

2,518,420

UNITED STATES PATENT OFFICE 2,518,420

CATION-EXCHANGE RESINS IN SPHEROIDAL FORM

William L. Evers, Moorestown, N. J., assignor to Rohm & Haas Company, Philadelphia, Pa., a corporation of Delaware No Drawing. Application October 24, 1946, Serial No. 705,477

5 Claims. (Cl. 260—49)

This invention relates to a process for preparing cation-exchange resins in the form of insoluble and infusible spheroids, globules, or "beads" as well as to the resulting product.

In the preparation of ion-exchange resins heretofore, it was customary to condense the reactants in a solvent until a resinous gel formed and thereafter to heat the gel en masse, usually in an oven, until it was converted into a porous, insoluble, and infusible mass which was then granulated by grinding and screened to a size suitable for the intended use. This procedure was not only very time-consuming but also resulted in the formation of about 20% of "fines," that is, particles which were too small for the customary applications of ion-exchange resins.

In accordance with this invention, cation-exchange resins are made in spheroidal form in approximately one-tenth the time required by former methods. In addition, the quantity of undesirable fines is markedly reduced.

The ion-exchange resins in spheroidal form have real advantages over ion-exchange resins in the usual irregular, granular form. Thus, the spheroids of resin pack more densely and especially more uniformly in ion-exchange columns or beds and have a much higher capacity per unit of volume than do granulated resins of the same approximate size. At the same time, the spheroids do not become wedged or compressed together, as do granules, with subsequent clogging of the equipment. This last is of great importance in the operation of ion-exchange units; and, with the use of spheroids, there is much less head loss. Beds or layers of spheroidal particles may be back-washed and also regenerated much more rapidly and efficiently than beds of granular particles. Whereas the liquids pass freely through beds of spheroids during backwashing, they pass much less freely through beds of compacted granules and in many cases force the entire bed up against the top of the vessel containing the resin and thereby plug the orifices. When flow rates are high, a fluid passes through a bed of spheroids in streamlined flow as contrasted with its turbulent flow through a bed of granulated particles. Furthermore, the loss by attrition of spheroidal particles of resins is much less than in the case of granulated particles. This apparently is due to the ability of the spheroids to roll freely, whereas the irregularly-shaped granules constantly abrade one another, resulting in loss of resin which often is as high as 5% per year in commercial installations.

It has now been found that insoluble, infusible ion-exchange resins in spheroidal form, and having the above advantages over granulated resins, may be produced by first preparing a solution of a resinous phenol-aldehyde condensate containing sulfonate groups and thereafter admixing with the solution a water-immiscible organic liquid which does not dissolve or react with the condensate. The mixture so prepared is then agitated in order to disperse the solution of said condensate in the organic liquid in the form of spheroids or globules. Agitation is continued, and the mixture is simultaneously heated to a temperature at which the solvent is driven off and the particles of resinous condensate are converted to the insoluble and infusible stage. The resulting spheroidal or globular particles of resin are then removed from the inert organic liquid.

The resinuous condensates which are converted by this process into insoluble, infusible, hard, spheroidal or globular particles are phenol-aldehyde reaction products containing sulfonate groups. They are a well-known class of thermosetting, sulfonated, phenol-aldehyde resins which in the heat-converted, insoluble, and infusible stage, i. e., in the "C-stage," have the ability to adsorb cations from fluids. While all of the condensates included within the scope of this invention contain sulfonate groups, such groups may be present in different positions within the resin molecule. Thus, they may be nuclear sulfonate groups attached directly to a benzene ring, or they may be extra-nuclear sulfonate groups attached to a group other than a benzene nucleus. The preferred class of sulfonated condensates are those made from phenol and formaldehyde which have a formaldehyde to phenol ratio of 1.5 to 3.0 on a molar basis. Suitable thermosetting, sulfonated, phenol-aldehyde condensates which may be converted into ion-exchange resins in spheroidal form are described, for example, in the following patents: Holmes, 2,191,853; Wassenegger, 2,319,359 and 2,204,539, and Findlay, 2,230,-641.

It is preferred, though not essential, to have the resinous condensate at a well-advanced state before dispersing the solution thereof in the organic liquid since this reduces the time required to convert the spheroidal droplets of condensate to the insoluble and infusible form. Furthermore, all other factors being constant, a highly condensed material tends to produce smaller spheroids than one which is not condensed so far. In all cases, however, the condensate must be in a fluid condition when it is mixed with and dispersed in the organic liquid. This is ordinarily no problem, however, because it is customary to prepare such condensates in aqueous solution or in a mixture of alcohol and water. One precaution must be observed, namely, that the condensate must not be in a gelled condition when it is added to the inert liquid, because a gelled condensate does not disperse satisfactorily in the organic liquid. Condensation must be stopped short of gelation, or solvents must be added to insure that the resinous material has flow and is in the liquid condition when it is admixed with the inert organic liquid.

The organic liquid in which the resinous condensate is dispersed must be inert under the conditions of operation and must not react chemically with the condensate. It must be immiscible with water which may be present with the condensate as water of solution or condensation or both. It must also be a non-solvent for the condensate. Its boiling point should be at least as high as that of water, and preferably over 140° C., so that the thermal conversion of the resinous condensate will take place rapidly. The upper limit of boiling point range is not critical, although 200° C. is preferred. Liquids which boil above 200° C. may be used, provided they meet the other requirements of immiscibility with water and inertness. In such cases, the liquid is merely heated to, and held at, a temperature which causes conversion of the resin and vaporization of any water which may be present, regardless of whether or not the liquid boils. In addition, it is desirable, though not essential, that the density of the liquid be approximately that of the condensate so that the latter does not tend to settle in or float upon the liquid.

Satisfactory liquids for this purpose include halogenated organic compounds, particularly the halogenated aromatic compounds, examples of which are ortho-, meta-, and para-dichlorbenzene, dichlor-diethyl ether, 2,2-dichlor-1-bromethane, butylidene chloride, 1,4-dichlorbutane, α-naphthyl chloride, p-chlorphenetole, o-bromanisole, brom-diphenyl ether, ortho- and meta-dibrombenzene, 1,2-dibromhexane, ortho- and meta-tolyl bromide, and the like.

Mineral oils also may be used as the inert organic liquid. While, for this purpose, a heavy, white, refined oil of U. S. P. grade is preferred, other grades, such as transformer oils, have been used successfully. Although the density of such oils is less than that of the condensate, the higher viscosity of the oil is a compensating factor; and, as a result, the particles of resin remain uniformly suspended. Mineral oils having a viscosity of about 100 to about 500 S. U. S. at 100° F. are recommended.

Dispersing agents greatly assist in holding the resin particles in suspension during the heating period and also prevent the particles from coalescing into larger aggregates as they are heat-converted. This is especially true when the halogenated hydrocarbons are employed. When other factors are held constant, an increase in the amount of the dispersing agent results in the formation of smaller spheroids and an increased tendency of the mixture to foam. Satisfactory amounts of dispersing agents range from 0.02% to 0.5%, based upon the amount of resinous condensate per se, although an upper limit of 0.1% is preferred. A wide variety of well-recognized dispersing agents may be employed, including sodium and potassium soaps of fatty acids, such as sodium stearate and potassium oleate, sodium polymethacryate, and synthetic dispersing agents, especially those having very high molecular weight such as are described in United States Patents 2,115,192; 2,167,325, and 2,167,326. The dispersing agent can be added before, during, or after the mixing of the resinous condensate and the organic liquid, although it is ordinarily most convenient to mix the dispersing agent and organic liquid prior to the addition of the resinous condensate.

It is necessary that agitation be maintained throughout the heating period. Conventional means may be employed. When all other factors are held constant, an increase in the degree of agitation will result in the formation of smaller spheroids.

During the period of heating and agitation, the resinous material continues to condense and polymerize. Water of reaction as well as any water of solution is distilled off. Some of the organic liquid may also distil off with the water. The spheroidal particles go through a gel stage as the heating progresses, and ultimately the gelled particles are converted to the insoluble and infusible stage. For the most part, the particles have the appearance of small spheroids or globules, although some may be slightly flattened or elongated due presumably to collision during their formation.

The time required to convert the spheroidal particles to their final form is in all cases much less than is required when the condensate is converted en masse at the same temperature by the methods of the prior art. This is due to better heat transfer in the case of the small particles as contrasted with the very slow heat transfer through a large mass of resinous condensate.

Temperature is a most important factor in the conversion of the resinous particles to the final heat-converted stage. For purposes of speed and economy, it is desirable that the temperature be as high as possible. The upper limit of temperature is that at which the resinous condensate chars or decomposes. The lower limit is that at which water may be distilled off. Suitable temperatures are from about 100° C. to about 200° C., while those from about 140° C. to about 180° C. are preferred.

After the particles of condensate have been converted to the infusible stage, they are removed from the organic liquid by conventional means, such as by filtering or centrifuging, and are then washed, dried, and screened.

The products may be used in the hydrogen form, i. e., in the acid form, or in the salt form for adsorbing ions. Treating the resinous spheroids with acid converts them to the hydrogen form while a treatment with a solution of a salt, such as a water-soluble chloride or bicarbonate of an alkali or alkaline earth metal, will produce the salt form of the resin.

The following examples are illustrative of the process of this invention:

*Example 1*

Into a three-liter, three-necked flask, equipped with thermometer, condenser and receiver, and an agitator of the anchor type having four-inch blades pitched to give an upward thrust, were charged 104.4 grams of phenol and seventy grams of sodium sulfite. Agitation at the rate of 260 revolutions per minute was begun and was continued to the end of the process. The mixture was heated to 85° C., after which 216 grams of a 37% aqueous solution of formaldehyde was slowly added while the temperature of the mixture within the flask was maintained at 80°–85° C. After the formaldehyde had been added, the mixture was held and condensed at 78°–82° C. until a sample thereof had a viscosity of eight poises when measured at 25° C. Sixteen hundred grams of ortho-dichlorbenzene containing 0.23 gram of sodium stearate was added, and the temperature was raised rapidly to 178° C. During this period of heating and agitation, the phenolic condensate formed small spheroids throughout the ortho-dichlorbenzene. These spheres passed from the fluid stage to a gelled condition and, finally, to an insoluble, infusible stage. Also, water was evaporated, condensed, and removed together with some ortho-dichlorbenzene. When the temperature had reached 178° C., heating was discontinued and the flask and contents were cooled to 50° C., at which point the resinous spheroids were removed by filtration from the ortho-dichlorbenzene and dried. The globular particles were washed with dilute sulfuric acid, then with water, and finally with a solution of sodium bicarbonate, which converted the resin into the sodium form.

The spheroids were screened, and slightly more than 98% passed through a 12-mesh screen and was retained on a 50-mesh screen. Less than 2% was removed as "fines." The screened particles were then placed in a conventional ion-exchange column, where they were found to pack well and to have high capacity for adsorbing cations (2.7 milliequivalents per gram in a hydrochloric acid-sodium chloride cycle) and to have excellent regenerating characteristics.

*Example 2*

A mixture of one hundred grams of water, one hundred grams of phenol, 33.7 grams of sodium sulfite, and 21.7 grams of an aqueous solution of formaldehyde was placed in a three-necked flask equipped with thermometer, agitator, and a reflux condenser. While being agitated, the mixture was heated to 95° C., held at 90°–95° C. for ten hours, and then cooled to 80° C. While the temperature was held at 80°–85° C., there was added 107.8 grams of a 37% aqueous solution of formaldehyde, after which the temperature was raised to 95° C. and held at this point for one hour. The reflux condenser was replaced with a gooseneck condenser and receiver, and to the contents of the flask was added 1450 grams of dichlor-diethyl ether containing 0.22 gram of sodium stearate. This mixture was agitated at the rate of 260 revolutions per minute, heat was applied, water and some of the ether distilled off, and the temperature rose to 170° C., at which point the condensate, which formed as small spheroids, passed through the gel stage and was converted to an insoluble and infusible form. The spheroids were filtered off, dried, treated in turn with a dilute solution of sulfuric acid, water, and finally a solution of sodium chloride in order to convert the resin to the sodium form.

The product had a capacity of 1.45 milliequivalents per gram in a hydrochloric acid-sodium chloride cycle.

*Example 3*

A mixture of 232 grams of hydrated sodium phenol sulfonate, 105 cc. of water, and thirty-one cc. of concentrated (37%) hydrochloric acid was placed in a one-liter, three-necked flask equipped with thermometer, stirrer, and reflux condenser. Agitation was begun and the mixture was heated at 80° C., at which point 66.7 grams of a 36.5% aqueous solution of formaldehyde was added. The mixture was heated to boiling and was refluxed for one-half hour. After being cooled to 60° C., the mixture was adjusted to a pH of 8.5 with caustic soda, reheated to 85° C., and treated with 33.3 grams of aqueous formaldehyde. Heating was continued at 85° C. for forty-five minutes, and then twenty-three grams of phenol was added. After forty-five minutes of heating, forty-one grams of aqueous formaldehyde was added and heating was then continued for one hour at 85° C. Finally, sixteen grams of aqueous formaldehyde was added, and the reaction progressed at 85° C. until a sample of the reaction mixture had a viscosity of eight poises as measured at 25° C.

A three-liter, three-necked flask was equipped with thermometer, stirrer, and condenser and receiver; and into the flask was poured 1493 grams of ortho-dichlorbenzene containing one gram of sodium stearate. This was agitated at the rate of 260 revolutions per minutes and was heated to 55° C., at which point was added 373 grams of the resin solution prepared above. Agitation was continued, and the mixture was heated to 150° C. over a period of one hour. During the heating period, 208 cc. of water and 148 cc. of ortho-dichlorbenzene were removed by distillation and the resin was converted into insoluble and infusible spheroidal particles, which were filtered and washed as in the previous examples.

This product also contained less than 2% "fines" and had high capacity for sorbing cations and excellent regenerating properties.

*Example 4*

A. Four hundred grams of a condensate prepared according to the procedure of Example 1 was mixed with 1060 grams of U. S. P. heavy white mineral oil in a three-necked flask equipped with stirrer, thermometer, condenser and receiver. Agitation at the rate of 520 revolutions per minute was started, and the mixture was heated to 170° C. over a period of two and three-quarter hours. During this time, the condensate was dispersed in the form of fluid, spheroidal droplets which went through the gel stage and were finally converted to the insoluble and infusible stage. The mixture was then cooled to 50° C., at which point the spheroidal particles were separated by filtration, washed with mineral spirits, and dried. The dried spheroids were then converted to the sodium form in the manner described above and were found to have high capacity for adsorbing cations.

B. In a variation of the process of part A above, 0.12 gram of sodium stearate was added to the mineral oil. Otherwise, the process was that described. The product consisted of infusible spheroids which were smaller than the particles made in the absence of dispersing agent but which had essentially the same capacity for adsorbing cations on a weight basis.

C. In a second variation of the original (A) process of this example, 0.12 gram of sodium stearate was added and the rate of stirring was reduced to 260 revolutions per minute. The spheroids produced in this way were larger than those prepared under B at the higher rate of stirring in the presence of sodium stearate and were essentially the same size as those prepared under A.

It is possible to vary the size of the resinous spheroids from one batch to another by varying such factors as the degree of agitation, the amount and kind of dispersing agent, the constituents of the resinous condensate, the temperature, and the like. This is evident in part from a consideration of Example 4. In any one batch, however, the particles will vary over only a small range of sizes, and this is decidedly advantageous. Rapid agitation, high concentration of dispersing agent, low aldehyde to phenol ratio in the condensate, a high degree of condensation prior to dispersing, are all factors which tend to make for small spheroids. Thus, by balancing the various factors, it is possible to obtain globules, spheroids, or "beads" which range in diameter from 0.2 mm. to 2.5 mm. It is preferred that the spheroids which are used in columns or beds in conventional ion-exchange processes have a diameter of about 0.3 to about 1.7 mm. Particles of this preferred range of sizes will pass through a 12-mesh screen and be retained on a 50-mesh screen.

I claim:

1. A process for preparing ion-exchange resins in spheroidal form which comprises preparing in fluid solution a resinous, thermosetting, phenol-aldehyde condensate containing sulfonate groups, mixing said solution of said condensate with a water-immiscible organic liquid which is inert toward said condensate and is not a solvent therefor, agitating the mixture, and dispersing said solution in the form of fluid spheroids in said organic liquid, continuing the agitation and simultaneously heating said mixture from about 100° C. to about 200° C. until said spheroids are free of original solvent and are converted to an insoluble, infusible porous state, and separating said organic liquid and said spheroids.

2. A process for preparing ion-exchange resins in spheroidal form which comprises preparing in aqueous solution a resinous, thermosetting, phenol-aldehyde condensate containing sulfonate groups, mixing said solution of said condensate with a water-immiscible organic liquid which is inert toward said condensate and is not a solvent therefor, agitating the mixture, and dispersing said solution in the form of fluid spheroids in said organic liquid, continuing the agitation and simultaneously heating said mixture from about 140° C. to about 180° C. until said spheroids are free of water and are converted to an insoluble, infusible porous state, and separating said organic liquid and said spheroids.

3. A process for preparing ion-exchange resins in spheroidal form which comprises preparing in aqueous solution a resinous, thermosetting, phenol-formaldehyde condensate containing sulfonate groups, mixing said solution of said condensate with a water-immiscible organic liquid which is inert toward said condensate and is not a solvent therefor, agitating the mixture, and dispersing said solution in the form of fluid spheroids in said organic liquid, continuing the agitation and simultaneously heating said mixture from about 140° C. to about 180° C. until said spheroids are free of water and are converted to an insoluble, infusible porous state, and separating said organic liquid and said spheroids.

4. A process for preparing ion-exchange resins in spheroidal form which comprises preparing in fluid solution a resinous, thermosetting, phenol-formaldehyde condensate containing sulfonate groups, mixing said solution of said condensate with 0.02% to 0.5%, based on the condensate, of a dispersing agent and a water-immiscible, liquid, halogenated hydrocarbon which has a boiling point between about 100° C. and about 200° C. and a specific gravity of about 1.0 to 1.6 at 25° C. and which is inert toward said condensate and is not a solvent therefor, agitating the mixture and dispersing said solution in the form of fluid spheroids in said halogenated hydrocarbon, continuing the agitation and simultaneously heating said mixture from about 140° C. to about 180° C. until said spheroids are free of original solvent and are converted to an insoluble, infusible porous state, and separating said halogenated hydrocarbon and said spheroids.

5. A process for preparing ion-exchange resins in spheroidal form which comprises preparing in fluid solution a resinous, thermosetting, phenol-formaldehyde condensate containing sulfonate groups, mixing said solution of said condensate with a mineral oil having a viscosity of 100 to 500 S. U. S. at 100° F. and which is inert toward said condensate and is not a solvent therefor, agitating the mixture and dispersing said solution in the form of fluid spheroids in said mineral oil, continuing the agitation and simultaneously heating said mixture from about 140° C. to about 180° C. until said spheroids are free of original solvent and are converted to an insoluble, infusible porous state, and separating said mineral oil and said spheroids.

WILLIAM L. EVERS.

REFERENCES CITED

The following references are of record in the file of this patent:

UNITED STATES PATENTS

| Number | Name | Date |
|---|---|---|
| 2,223,394 | Thompson | Dec. 3, 1940 |
| 2,259,503 | Wassenegger et al. | Oct. 21, 1941 |
| 2,294,226 | D'Alelio | Aug. 25, 1942 |
| 2,319,359 | Wassenegger | May 18, 1943 |
| 2,356,081 | Novotny | Aug. 15, 1944 |
| 2,361,754 | McFarland | Oct. 31, 1944 |
| 2,384,945 | Marisic | Sept. 18, 1945 |